United States Patent [19]
Peter

[11] Patent Number: 5,415,823
[45] Date of Patent: May 16, 1995

[54] METHOD AND APPARATUS FOR MANUFACTURING RUBBER MIXTURES

[75] Inventor: Julius Peter, Dommayergasse 7/13, A-1130 Vienna, Austria

[73] Assignees: Julius Peter, Vienna, Austria; Continental Aktiengesellschaft, Hanover, Germany

[21] Appl. No.: 217,933

[22] Filed: Mar. 24, 1994

[30] Foreign Application Priority Data

Mar. 24, 1993 [DE] Germany .......... 43 09 451.1

[51] Int. Cl.⁶ .......... B29B 7/04; B29B 7/24
[52] U.S. Cl. .......... 264/175; 264/176.1; 264/349; 366/77; 366/91; 425/204; 425/205; 425/209; 425/363; 425/377
[58] Field of Search .......... 264/175, 349, 176.1; 366/76, 77, 91; 425/204, 205, 209, 363, 377, 382.3

[56] References Cited

U.S. PATENT DOCUMENTS

| | | | |
|---|---|---|---|
| 2,540,195 | 2/1951 | Engler | 264/175 |
| 2,804,651 | 9/1957 | Peterson | 264/349 |
| 3,487,141 | 12/1969 | George | 264/175 |
| 4,469,817 | 9/1984 | Hayashi et al. | |
| 4,938,605 | 7/1990 | Friedrich | 425/209 |
| 5,070,624 | 12/1991 | Vero et al. | |
| 5,108,188 | 4/1992 | Peter et al. | 264/39 |

*Primary Examiner*—Mathieu D. Vargot
*Attorney, Agent, or Firm*—Robert W. Becker & Associates

[57] ABSTRACT

A method of manufacturing a rubber mixture includes the step of mixing at a first temperature in a batchwise operation a base mixture of rubber and non-reactive additives in a ram mixer. In a subsequent step the base mixture is removed from the ram mixer and formed to a strand. The strand is cooled to a temperature at which the strand is still warm. The warm strand is then fed to a ramless mixer and reactive additives are added. In a batchwise operation the base mixture and the reactive additives are mixed at a second temperature that is lower than the first temperature in order to form a finished rubber mixture. Preferably, cooling and feeding of the strand are performed simultaneously.

11 Claims, 1 Drawing Sheet

5,415,823

METHOD AND APPARATUS FOR MANUFACTURING RUBBER MIXTURES

BACKGROUND OF THE INVENTION

The present invention relates to a method for manufacturing rubber mixtures in which in a first step in a ram mixer a base mixture is produced from rubber and non-reactive additives in a batchwise manner and in which in a second step the base mixture, without being stored intermediately, is finished in a ramless mixer in a batchwise manner by adding reactive additives at a reduced temperature.

In the known methods of the aforementioned kind the cooling within the ramless mixer is in general sufficient to cool the base mixture below the scorch time limit and furthermore to mix homogeneously the reactive additives within the working cycle time. The working cycle of the base mixer, on the one hand, and of the finishing mixture, on the other hand, are to be adjusted relative to one another.

With especially large mixing units and/or for very viscous or rapidly curing mixtures, for example, adhesive mixtures for metals, the difficulty may result that the cooling and finishing mixing in comparison to the mixing of the base mixture requires more time. Under these conditions an economical operation of a batch-type operation is no longer possible.

These disadvantages are to be eliminated with the present invention. Accordingly, the present invention has the object to provide a method that ensures an adaptation of the working cycle during base mixing and finishing-mixing even when the aforementioned special conditions are present.

BRIEF DESCRIPTION OF THE DRAWING

This object and other objects and advantages of the present invention, will appear more clearly from the following specification in conjunction with the only drawing FIG. 1, in which a mixing device is schematically represented within a multi-story building.

SUMMARY OF THE INVENTION

Figure 1:
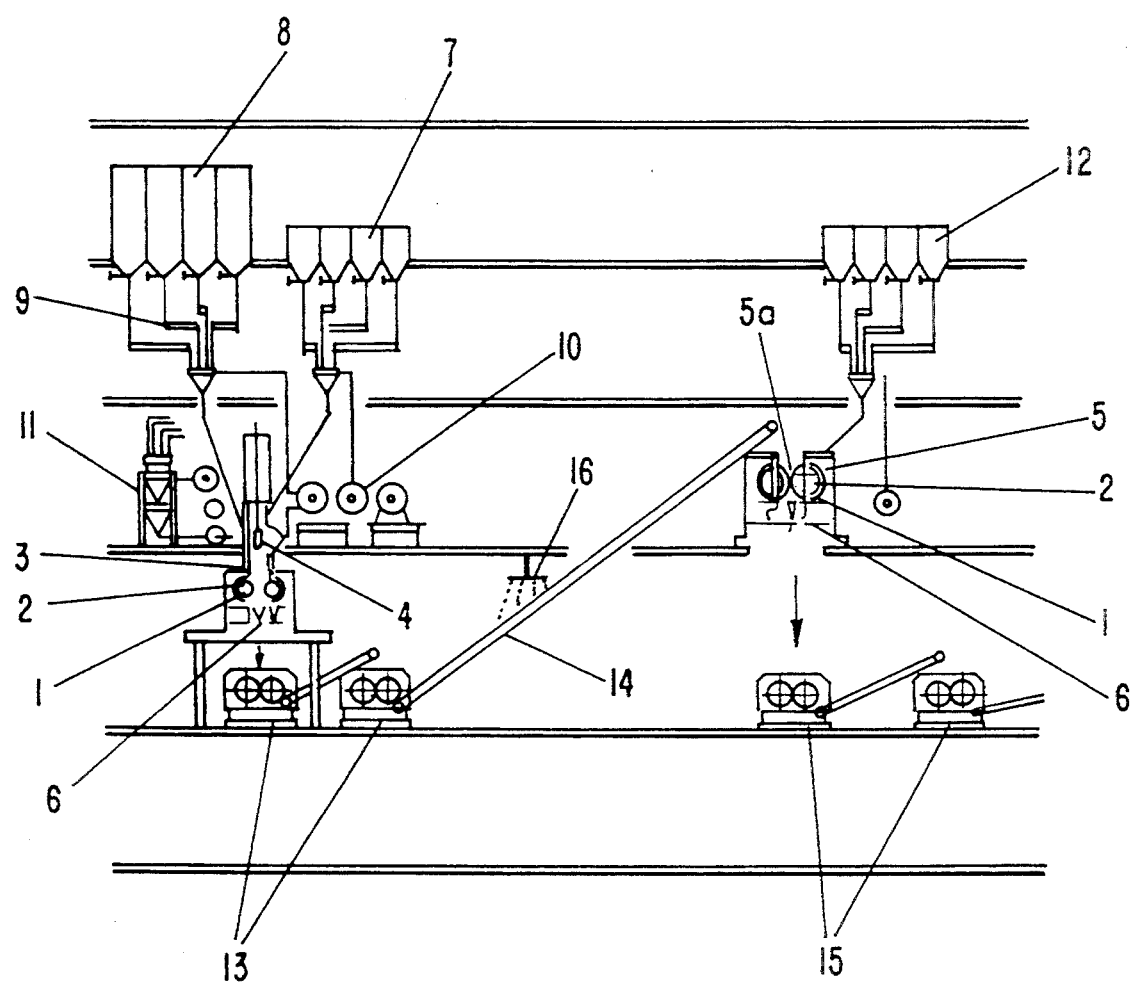

The inventive method for manufacturing a rubber mixture is primarily characterized by the following steps:

Mixing at a first temperature in a batchwise operation a base mixture of rubber and nonreactive additives in a ram mixer;

Removing the base mixture from the ram mixer;

Forming the base mixture to a strand;

Cooling the strand to a temperature at which the strand is still warm;

Feeding the warm strand to a ramless mixer;

Adding reactive additives to the base mixture in the ramless mixer; and

Finishing in a batchwise operation mixing of the base mixture and the reactive additives at a second temperature lower than the first temperature to form a finished rubber mixture.

Preferably, the method further comprises the step of shaping the strand so as to have a flat rectangular cross-section, wherein the steps of cooling and feeding are preferably performed simultaneously.

Advantageously, in the step of cooling the strand is cooled to a temperature range of between 50° C. to 100° C., more preferred to a range of 70° C. to 90° C. Preferably, in the step of feeding the strand has a temperature of 50° to 100° C., preferably a temperature of between 70° C. to 90° C.

Advantageously, the step of cooling includes the step of applying water to the strand such that the heat of evaporation of the water is sufficient to dry the strand.

Expediently, the step of forming includes the step of positioning at least one calender unit or at least one extruder unit below the ram mixer. Advantageously, the step of forming includes the step of directly supplying the base mixture to the calender unit or the extruder unit.

In a further aspect of the present invention, a device for manufacturing a rubber mixture is disclosed. The inventive device preferably comprises:

A ram mixer for mixing at a first temperature in a batchwise operation a base mixture of rubber and non-reactive additives;

Means for supplying the non-reactive additives to the ram mixer;

Means for supplying rubber to the ram mixer;

A ramless mixer for finishing in a batchwise operation mixing of the base mixture and reactive additives at a second temperature lower than the first temperature to form a finished rubber mixture, the ramless mixer having a feed mouth;

Means for adding reactive additives to the base mixture in the ramless mixer;

Means for forming the base mixture coming from the ram mixer to a strand of a flat rectangular cross-section;

A conveyor belt, positioned between the means for forming and the ramless mixer, for conveying the base mixture from the means for forming to the ramless mixer; and Means for cooling the strand during conveying to a temperature at which the strand is still warm.

According to the present invention it is suggested that the base mixture after leaving the base mixer is formed to a strand, cooled, and fed to the ramless mixer in a cooled condition. This intermediate working step is performed initially by a calender unit or extruder unit positioned below the base mixer in which the calendar unit base mixture is formed. The resulting strand is then cooled while being conveyed on a conveyor belt and is fed into the ramless mixer at a temperature of approximately 50° to 100° C., especially at a temperature of approximately 70 to 90° C., whereby the strand is still in a warm state and is thus still easily workable.

Preferably, the base mixture is formed to a band, i.e., is shaped to a form with parallel planes because this shape provides for a good cooling effect and also ensures a secure transport on the conveyor belt. Furthermore, the cooling of the strand is preferably performed with water added in such an amount that the heat of evaporation is sufficient to dry the strand during transport.

DESCRIPTION OF PREFERRED EMBODIMENTS

The present invention will now be described in detail with the aid of several specific embodiments utilizing FIG. 1.

The two main components of the mixing device are two so-called inner mixers with a mixing chamber 1 having positioned therein rotors 2. The base mixer 3 is a kneading device provided with a ram 4, while the finishing mixer 5 is a ramless kneader which is thus freely accessible from the top, but is provided with a pivotable saddle 6 for emptying the mixer. The base mixture 3 also has a saddle for emptying the mixer.

The base mixer 3 is provided with a plurality of auxiliary devices, i.e., a supply container 7 for chemicals, a supply container 8 for fillers, a device 9 for metering and weighing, a device 10 for supplying rubber, and a device 11 for supplying oil. The finishing mixer 5 is provided with a device for supplying chemicals 12.

Below the base mixer 3 a calender unit 13 is positioned adjacent to which a conveyor belt 14 is located that has coordinated therewith water cooling devices 16 that will not be explained in further detail. The conveyor belt 14 extends to the feed mouth of the finishing mixer 5. Below the finishing mixer 5 a further calender unit 15 is located which is used to convey the finished rubber mixture to further work stations, for example, a batch-off device.

After producing in the base mixer 3 the base mixture, the batch of base mixture falls onto the calender unit 13 and has a temperature of approximately 130° to 190°. The calender unit 13 forms the base mixture to a band of a flat rectangular cross-section which is then conveyed by the conveyor belt 14. During conveying on the conveyor belt 14, the base mixture strand is cooled, respectively, treated by spraying (16) with water or submerging in water such that the base mixture band is cooled to a preferred temperature of approximately 70° to 90°. This water treatment (cooling) is performed such that due to the temperature of the base mixture strand the water is evaporated and the strand is dried due to the heat of evaporation so that the strand is fed into the ramless mixer 5 in a dry, still warm condition.

After a batch has been collected within the finishing mixer 5, the finishing-mixing step is performed for which the supply device 12 is used. It is possible to start the cycle of finishing-mixing before the correct batch amount (weight) has been reached.

Accordingly, the working cycle time of the finishing-mixing operation is reduced since the finishing-mixer 5 is supplied with a base mixture of a reduced temperature. Accordingly, the cycle of finishing mixing is adapted to the base mixing operation.

The present invention is, of course, in no way restricted to the specific disclosure of the specification and drawings, but also encompasses any modifications within the scope of the appended claims.

What is claimed is:

1. A method of manufacturing a rubber mixture, said method comprising the steps of:

mixing at a first temperature in a batchwise operation a base mixture of rubber and non-reactive additives in a ram mixer;

removing the base mixture from the ram mixer;

forming the base mixture to a strand;

cooling the strand to a temperature at which the strand is still warm;

feeding the warm strand to a ramless mixer;

adding reactive additives to the base mixture in the ramless mixer; and finishing in a batchwise operation mixing of the base mixture and the reactive additives at a second temperature lower than the first temperature to form a finished rubber mixture;

wherein in said step of cooling the strand is cooled to a temperature range of between 50° C. to 100° C.

2. A method according to claim 1, further comprising the step of shaping the strand so as to have a flat rectangular cross-section, wherein said steps of cooling and feeding are performed simultaneously.

3. A method according to claim 1, wherein the strand is cooled to 70° C. to 90° C.

4. A method according to claim 3, wherein in said step of feeding the strand has a temperature of 70° C. to 90° C.

5. A method according to claim 1, wherein in said step of feeding the strand has a temperature of 50° C. to 100° C.

6. A method according to claim 2, wherein said step of cooling includes the step of applying water to the strand such that the heat of evaporation of the water is sufficient to dry the strand.

7. A method according to claim 1, wherein said step of forming includes the step of positioning at least one calender unit directly below the ram mixer.

8. A method according to claim 7, wherein said step of forming includes the step of directly supplying the base mixture to the calender unit.

9. A method according to claim 1, wherein said step of forming includes the step of positioning at least one extruder unit directly below the ram mixer.

10. A method according to claim 9, wherein said step of forming includes the step of directly supplying the base mixture to the extruder unit.

11. A device for manufacturing a rubber mixture, said device comprising:

a ram mixer for mixing at a first temperature in a batchwise operation a base mixture of rubber and non-reactive additives;

means for supplying the non-reactive additives to said ram mixer;

means for supplying rubber to said ram mixer;

a ramless mixer for finishing in a batchwise operation mixing of the base mixture and reactive additives at a second temperature lower than the first temperature to form a finished rubber mixture, said ramless mixer having a feed mouth;

means for adding reactive additives to the base mixture in said ramless mixer;

means for forming the base mixture coming from said ram mixer to a strand of a flat rectangular cross-section;

a conveyor belt, positioned between said means for forming and said ramless mixer, for conveying the base mixture from said means for forming to said ramless mixer; and means for cooling the strand during conveying to a temperature range of between 50° C. to 100° C.

* * * * *